(12) United States Patent
Calcev et al.

(10) Patent No.: US 9,456,408 B2
(45) Date of Patent: Sep. 27, 2016

(54) SYSTEM AND METHOD FOR BASIC SERVICE SET ASSOCIATION

(71) Applicant: Futurewei Technologies, Inc., Plano, TX (US)

(72) Inventors: George Calcev, Hoffman Estates, IL (US); Bin Chen, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/840,949

(22) Filed: Aug. 31, 2015

(65) Prior Publication Data

US 2015/0373631 A1    Dec. 24, 2015

Related U.S. Application Data

(63) Continuation of application No. 13/866,309, filed on Apr. 19, 2013, now Pat. No. 9,161,265.

(60) Provisional application No. 61/636,147, filed on Apr. 20, 2012.

(51) Int. Cl.
| | |
|---|---|
| *H04W 48/16* | (2009.01) |
| *H04W 28/10* | (2009.01) |
| *H04W 76/02* | (2009.01) |
| *H04W 48/02* | (2009.01) |
| *H04W 48/12* | (2009.01) |
| *H04W 84/12* | (2009.01) |
| *H04W 12/06* | (2009.01) |

(52) U.S. Cl.
CPC ............. *H04W 48/16* (2013.01); *H04W 28/10* (2013.01); *H04W 48/02* (2013.01); *H04W 76/02* (2013.01); *H04W 12/06* (2013.01); *H04W 48/12* (2013.01); *H04W 84/12* (2013.01)

(58) Field of Classification Search
CPC ... H04W 12/06; H04W 48/02; H04W 48/16; H04W 76/02; H04W 76/021; H04W 84/12
See application file for complete search history.

(56) References Cited

U.S. PATENT DOCUMENTS

| | | | |
|---|---|---|---|
| 9,042,288 B2 | 5/2015 | Calcev et al. | |
| 9,258,813 B2 * | 2/2016 | Park | H04W 48/10 |
| 2005/0180385 A1 | 8/2005 | Jeong et al. | |
| 2006/0142034 A1 * | 6/2006 | Wentink | H04W 8/005 |
| | | | 455/515 |
| 2006/0153156 A1 | 7/2006 | Wentink et al. | |
| 2007/0028273 A1 | 2/2007 | Zanaty | |
| 2007/0147317 A1 | 6/2007 | Smith et al. | |
| 2007/0155365 A1 * | 7/2007 | Kim | H04L 65/80 |
| | | | 455/410 |

(Continued)

OTHER PUBLICATIONS

Calcev, G., et al., "Sensor Only BSS," Doc:11-12-1083-01-00ah-Sensor Only BSS, Sep. 16, 2012, 18 pages.

(Continued)

*Primary Examiner* — Ahmed Elallam
(74) *Attorney, Agent, or Firm* — Slater Matsil, LLP

(57) ABSTRACT

In one embodiment, a method includes receiving, by a station (STA) from an access point (AP), a frame including a device type indicator and comparing the device type indicator with a device type accepted by a basic service set (BSS) of the AP to produce a comparison. The method also includes determining whether to associate the STA with the AP in accordance with the comparison, associating the STA with the AP upon determining to associate the STA with the AP, and not associating the STA with the AP upon determining not to associate the STA with the AP.

24 Claims, 6 Drawing Sheets

(56) References Cited

U.S. PATENT DOCUMENTS

| | | | |
|---|---|---|---|
| 2007/0217377 A1 | 9/2007 | Takeuchi | |
| 2007/0298720 A1 | 12/2007 | Wolman et al. | |
| 2011/0280229 A1* | 11/2011 | Montemurro | H04W 48/08 370/338 |
| 2013/0044877 A1 | 2/2013 | Liu et al. | |
| 2013/0102313 A1 | 4/2013 | Tinnakornsrisuphap et al. | |
| 2013/0121245 A1 | 5/2013 | Vermani et al. | |
| 2013/0142095 A1* | 6/2013 | Calcev | H04W 52/0219 370/311 |
| 2013/0155930 A1 | 6/2013 | Chu et al. | |
| 2013/0176902 A1* | 7/2013 | Wentink | H04W 52/0219 370/255 |
| 2013/0179500 A1 | 7/2013 | Kacin et al. | |
| 2013/0194992 A1 | 8/2013 | Fischer | |
| 2013/0223419 A1 | 8/2013 | Ghosh et al. | |
| 2013/0286826 A1 | 10/2013 | Park et al. | |
| 2014/0146805 A1* | 5/2014 | Lee | H04W 60/00 370/338 |
| 2014/0201212 A1* | 7/2014 | Qi | H04L 67/303 707/741 |

OTHER PUBLICATIONS

Supplementary European Search Report for Application No. 13777879 1, Applicant Huawei Technologies Co., Ltd., date of mailing Jul. 27, 2015, 12 pages.

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation," IEEE P802.11ah/D1.0, May 2013, 327 pages.

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation," IEEE P802.11ah/D1.0, Oct. 2013, 394 pages.

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications," IEEE Draft P802.11-REVmb/D12, Nov. 2011, 2910 pages.

International Search Report and Written Opinion, Application No. PCT/CN2013/074492, Applicant: Huawei Technologies Co., Ltd., mailed Jul. 25, 2013, 10 pages.

Park, M., et al., "TGah Efficient TIM Encoding," doc.: IEEE 802.11-121388r1, Mar. 14, 2012, 26 pages.

* cited by examiner

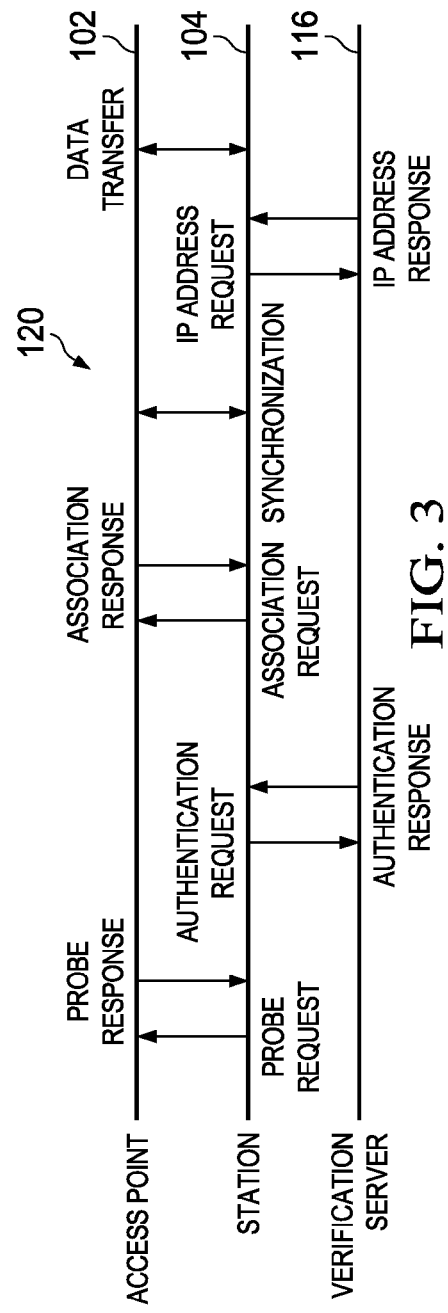

SYSTEM AND METHOD FOR BASIC SERVICE SET ASSOCIATION

This application is a continuation of U.S. patent application Ser. No. 13/866,309, filed on Apr. 19, 2013, entitled "System and Method for Basic Service Set Association," which claims the benefit of U.S. Provisional Application Ser. No. 61/636,147 filed on Apr. 20, 2012, and entitled "System and Method for BSS Separation," which applications are incorporated herein by reference.

TECHNICAL FIELD

The present invention relates to a system and method for wireless communications, and, in particular, to a system and method for basic service set (BSS) association.

BACKGROUND

WiFi, also referred to as wireless local area network (WLAN), uses IEEE 802.11 standard technologies as an air interface, including physical (PHY) and media access control (MAC) layers. In an IEEE 802.11 WLAN, the communication channel is shared by multiple stations, which may be coordinated by a distributed channel access function, i.e., a distributed coordination function (DCF), based on the carrier sense multiple access with collision avoidance (CSMA/CA) mechanism.

The DCF uses both physical and virtual carrier sense functions to determine the state of the medium. The physical carrier sense function resides in the PHY layer and uses energy detection and preamble detection to determine whether the medium is busy. The virtual carrier sense function resides in the MAC layer and uses reservation information carried in the duration field of the MAC header, which indicates the impending use of the wireless channel. The virtual carrier sense mechanism is called the network allocation vector (NAV). The wireless channel is determined to be idle only when both the physical and virtual carrier sense mechanisms indicate it to be so.

A station (STA) with a data frame for transmission may perform a clear channel assessment (CCA) by sensing the wireless channel for a fixed duration, i.e., the DCF interframe space (DIFS). If the wireless channel is busy, the station waits until the channel becomes idle for a DIFS, and then waits for a further random backoff period. The backoff timer decreases by one for every idle slot and freezes when the channel is sensed busy. When the backoff timer reaches zero, the station starts data transmission. In WiFi networks, the downlink traffic from an access point to a station is announced via a traffic indicator map (TIM).

SUMMARY

An embodiment method includes receiving, by a station (STA) from an access point (AP), a frame including a device type indicator and comparing the device type indicator with a device type accepted by a basic service set (BSS) of the AP to produce a comparison. The method also includes determining whether to associate the STA with the AP in accordance with the comparison, associating the STA with the AP upon determining to associate the STA with the AP, and not associating the STA with the AP upon determining not to associate the STA with the AP.

An embodiment method includes receiving, by an access point (AP) from a first station (STA), a first frame including a first device type indicator and comparing the first device type indicator with a device type accepted by a basic service set (BSS) of the AP to produce a first comparison. The method also includes determining whether to associate the first STA with the AP in accordance with the first comparison, associating the first STA with the AP upon determining to associate the first STA with the AP, and not associating the first STA with the AP upon determining not to associate the first STA with the AP.

An embodiment station (STA) includes a processor and a non-transitory computer readable storage medium storing programming for execution by the processor. The programming including instructions to receive, from an access point (AP), a frame including a device type indicator and compare the device type indicator with a device type accepted by a basic service set (BSS) of the AP to produce a comparison. The programming also includes instructions to determine whether to associate the STA with the AP in accordance with the comparison, associate the STA with the AP upon determining to associate the STA with the AP, and not associate the STA with the AP upon determining not to associate the STA with the AP.

An embodiment access point (AP) includes a processor and a non-transitory computer readable storage medium storing programming for execution by the processor. The programming including instructions to receive, from a station (STA), a frame including a device type indicator and compare the device type indicator with a device type accepted by a basic service set (BSS) of the AP to produce a comparison. The programming also includes instructions to determine whether to associate the STA with the AP in accordance with the comparison, associate the STA with the AP upon determining to associate the STA with the AP, and not associate the STA with the AP upon determining not to associate the STA with the AP.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 illustrates an embodiment message diagram for BSS association;

FIG. 3 illustrates another embodiment message diagram for BSS association;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
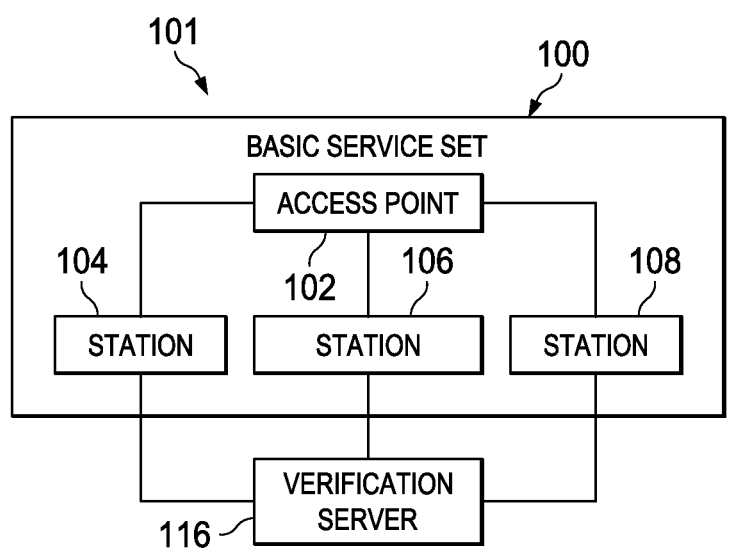
FIG. 1 illustrates an embodiment system for basic service set (BSS) association.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

IEE 802.11 launched a task group, TGah, for long range and low power sensor networks. TGah generally follows basic protocols of 802.11 and supports 1 MHz, 2 MHz, 4 MHz, 8 MHz, and 16 MHz channels. TGah creates specifications for under 1 GHz WiFi. This new WiFi design has a main application of sensor networks and a secondary use for traffic offloading from cellular networks. An additional application is for the backhaul, for example communication between access points. In an example, over 6000 devices are supported. An example WiFi network operates at narrow bandwidths of 1 MHz and 2 MHz by downclocking a 20 MHz WiFi network channel clock, leading to an increase in symbol duration from 4 µs to 40 µs.

Stations communicating in a WiFi network may be sensor devices, such as smart meters, temperature sensors, and pressure sensors, or offloading devices, such as smart phones, tablets, laptops, or other devices. Sensors may determine and upload data, while offloading devices may receive streamed audio or video, e-mail, internet, transmit and receive voice, download or play games, use services, or download large amounts of data. Sensor traffic tends to have a low data rate, a low duty cycle, and is utility operator managed. For example, sensors may upload traffic at a low duty cycle and occasionally download traffic, such as software uploads or data requests. However, offloading devices generally have a high and bursty data rate, and are cellular operator managed. For example, offloading devices may have mainly downlink traffic mixed with some uplink traffic, and tend to have non-uniform short duration activity. Also, sensors may be powered by batteries, and therefore additional overhead leads to a shorter battery life, and increased costs of battery replacement.

In a BSS with both sensors and offloading devices, most of the channel may be used by the aggressive offloading devices, while the less aggressive sensors experience delays. Also, the transmission power for offloading devices and sensor devices may be different, leading to a hidden node problem where some devices are unaware of other devices in the BSS. For example, sensors may use less power than offloading devices. Additionally, offloading traffic may require a high bandwidth and a high throughput, while sensor traffic operates at a lower bandwidth and a lower throughput. Operating at different bandwidths on a per packet basis generally requires additional signaling. There are also different physical layer demands for sensors and offloading devices. A BSS that supports only one type of traffic or device may provide special or targeted functions for the particular traffic or device type. BSS parameters, such as bandwidth, power, or beacon frequency may be adjusted and optimized based on the type of traffic carried by the BSS.

Different traffic types for sensors and offloading devices are suited for different BSS optimization, signaling, and services. For example, offloading could require the implementation of HS2.0 features. Also, offloading generally entails implementation of lawful intercept and emergency calls. Some network features may be used for a BSS serving offloading devices, but are not useful for a BSS serving sensors, and may create additional overhead. On the other hand, sensor networks may require additional features, such as last gasp signaling and a high volume association after power loss. Additionally, sensors may operate at lower bandwidths of 1 MHz or 2 MHz, while offloading devices operate at higher bandwidths. A BSS serving large areas of a smart grid or smart meter devices may reject offloading devices that may affect the sensor/smart grid reporting in the network. For example, delay in reporting, which may cause bad results, may be avoided with a sensor only BSS. Also, overhead may be saved. For example, when a sensor only BSS receives a probe request or a generic advertisement service (GAS) request message from an offloading station, the access point may ignore the request to avoid more overhead. In this example, access points that only support sensors may have no TIM in the beacon frame.

In an example, overloading is performed, where the same bits or field in a beacon frame, or another type of message, are used based on the actual traffic handled or by the traffic type or device type supported by the BSS. For example, a beacon frame for a BSS supporting offloading only may carry extended information about a hotspot, while a beacon frame for a BSS supporting sensors only may instead carry information about the maximum idle time per sensor. In another example, when the BSS is carrying mixed traffic, the beacon frame carries only partial information of the hotspot. Additionally, the packets sent and received in a particular BSS may have a field that indicates that the traffic is sensor only, offloading only, or mixed. This indicator may be in the PHY preamble or the MAC header. Other frames that may be overloaded include the probe request, probe response, or association request frames.

FIG. 1 illustrates system 101, which may associate stations to its access point. System 101 contains basic service set (BSS) 100 and verification server 116. In FIG. 1, BSS 100 contains access point 102, and is attached to station 104, station 106, and station 108. Stations 104, 106, and 108 are coupled to verification server 116. FIG. 1 illustrates three stations for clarity, but more or fewer stations may be associated with a single access point. For example, over 6000 stations may be associated with BSS 100.

In one example, BSS 100 may support only sensor devices. For example, BSS 100 may support a very large number of sensors and smart meters. On the other hand, BSS 100 may support supports only offloading devices. Alternatively, BSS 100 supports both sensors and offloading devices. For example, BSS 100 may support lower performance devices, for example for home deployment, and include a small number of sensors and a small number of offloading devices. BSS 100 may only support one device type, or may support multiple device types.

BSS 100 may change the traffic type or device type it supports. For example, BSS 100 may switch from supporting only sensors to supporting both sensors and offloading devices, or to only supporting offloading devices. In another example, BSS 100 may switch from only supporting offloading devices to only supporting sensors, or supporting both sensors and offloading devices. When BSS 100 changes the traffic or device type it supports, BSS 100 may signal stations 104, 106, and 108 of the change. The signal may cause the attached stations to change traffic type, for example from offloading to sensor traffic. Alternatively, the station may separate from BSS 100. In another embodiment, access point 102 may schedule that stations may send only a particular type of traffic for a specific period of time. For example, BSS 100 may support sensor traffic only during the night, offloading traffic only during rush hours, and both types of traffic during the rest of the day. Thus, the load may be balanced, providing a high quality of service (QoS).

FIG. 2 illustrates messaging diagram 110 with messages exchanged between station 104, access point 102, and verification server 116. Initially, access point 102 broadcasts a beacon frame, which is received by station 104. The beacon frame may be a normal beacon frame or a short beacon frame. The beacon frame may contain a BSS traffic type indicator which indicates the device type or traffic type accepted by BSS 100, and therefore of access point 102. For example, BSS 100 may associate with only sensors, only offloading devices, or both sensors and offloading devices. In one example, the BSS traffic type indicator contains one bit that indicates if BSS 100 supports sensors only or both sensors and offloading devices. In another example, the BSS traffic type indicator has two bits that indicate if BSS 100 supports sensors only, offloading devices only, sensors and offloading devices, and a reserved bit. In an additional example, BSS traffic type indicator contains more than two bits. Alternatively, the beacon frame's short-long sequence may have a different periodicity that indicates if BSS 100 supports sensors only or sensors and offloading devices. In another embodiment, the beacon frame indicates that BSS 100 supports sensors only in some channels and offloading devices only in other channels. For example, BSS 100 may support sensors only in the 1 MHz and 2 MHz channels, and offloading devices only in the 4 MHz, 8 MHz, and 16 MHz channels. When station 104 receives a beacon frame from access point 102 indicating that station 104 is of a traffic or device type that is not supported by BSS 100, station 104 may not pursue association with access point 102. However, when station 104 receives a beacon frame from access point 102 is of a traffic type or device type that BSS 100 supports, station 104 may pursue association with access point 102. In another example, the beacon frame does not contain information on the traffic type or device type supported by BSS 100.

When station 104 pursues association further with BSS 100, station 104 transmits an authentication request to verification server 116. Verification server 116 verifies the credentials of station 104. After verifying that station 104 is what it claims to be, verification server 116 transmits an authentication response to station 104. The authentication response indicates whether authentication is granted to station 104.

After authentication is granted, station 104 may optionally transmit an information request to access point 102. Station 104 may directly transmit the information request to access point 102. The information request may request information that station 104 will use to decide which of multiple access points that station 104 is in the coverage area of to pursue association with. For example, the association request may request information on the service provider or load of access point 102. Access point 102 may then respond with an information response containing the information that station 104 requested.

If station 104 further pursues association with access point 102, station 104 transmits an association request to access point 102. The transmission of the association request may indicate to access point 102 that station 104 is of a traffic or device type supported by BSS 100, and that the pursuit of association is warranted. The association request may include information on the traffic or device type of station 104. In response, access point 102 transmits an association response to station 104. The association response indicates if association is granted to station 104. Association may be granted if station 104 has a traffic type or is of a device that BSS 100 supports. However, association may not be granted if station 104 is not of a traffic type or a device type that BSS 100 supports. If association is granted, the association response may include an association identification number (AID) for station 104. When association is granted, station 104 becomes attached to access point 102. Then, synchronization between access point 102 and station 104 is performed. Station 104 reads the time indication in the beacon and adjusts its own clock to follow the clock of access point 102.

After association is granted, station 104 requests an internet protocol (IP) address from verification server 116. Verification server 116 then responds with an IP address response containing the IP address of station 104.

Finally, data is transferred between station 104 and access point 102. Station 104 may transmit data to access point 102, and access point 102 may transmit data to station 104.

Alternatively, association may be performed by a relay station coupled between station 104 and access point 102.

In another example, station 104 indicates its traffic type via a direct request or action elements.

FIG. 3 illustrates messaging diagram 120 for BSS association. Messaging diagram 120, which is similar to messaging diagram 110, contains messages between access point 102, station 104, and verification server 116. Initially, in the active discovery case, instead of access point 102 transmitting a beacon frame to station 104, station 104 transmits a probe request to access point 102. The probe request may include information on the traffic type or device type of station 104. Access point 102 may respond with a probe response to station 104. In an embodiment, only the access points that carry that type of traffic or type of devices will reply to the probe request broadcast message with a probe response message. The probe response may include the BSS traffic type indicator. Station 104 may decide not to further pursue association with access point 102 if it is of a traffic type or device type not supported by BSS 100.

In another example, if the probe request indicates that station 104 is not of a traffic type or device type supported by BSS 100, access point 102 may decide not to further pursue association with station 104. The probe response may indicate that access point 102 will not further pursue association with station 104. Alternatively, access point 102 may indicate that it will further pursue association with station 104 by transmitting a probe response, and indicate that it will not further pursue association by not transmitting a probe response.

If station 104 proceeds with association, station 104 may transmit an authentication request to verification server 116. Verification server 116 may then respond with an authentication response indicating whether station 104 is authenticated. If station 104 is authenticated, it may then send an association request to access point 102. In response, access point 102 transmits an association response to station 104 indicating if association is granted to station 104. Association may be not granted if station 104 is a device type that BSS 100 does not support. However, association may be granted if station 104 is a device type that BSS 100 supports. If association is granted, the association response may include an AID for station 104, and station 104 becomes attached to access point 102.

After association is granted, synchronization may be performed between access point 102 and station 104. Then, station 104 requests an IP address from verification server 116, and verification server 116 responds with an IP address response containing the IP address of station 104. Finally, access point 102 and station 104 exchange data.

Figure 4:
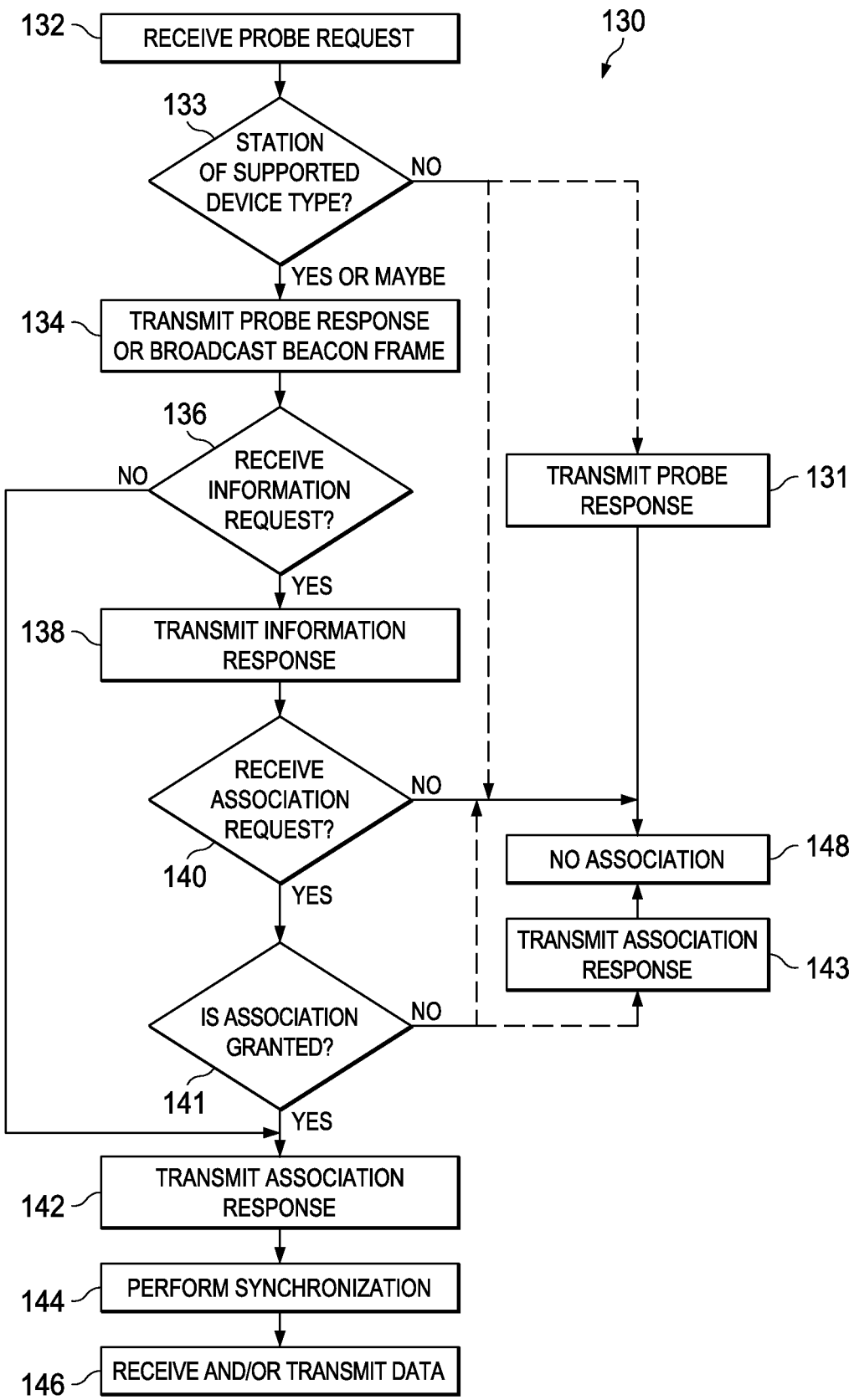
FIG. 4 illustrates an embodiment method for BSS association.

FIG. 4 illustrates flowchart 130 for a method of associating an access point with a station. Initially, in step 132, access point 102 may receive a probe request from station 104. The probe request may include information on the traffic type or device type of station 104. Next, in step 133, access point 102 may determine if station 104 is of a traffic type or a device type supported by BSS 100. When the probe request indicates that station 104 is not of a traffic type or a device type that BSS 100 supports, access point 102 may ignore the probe request, and proceed to step 148, no association. Alternatively, when the probe request indicates that station 104 is of a traffic type or device type that BSS 100 supports, access point 102 may transmit a probe response to station 104, indicating that access point 102 will not further pursue association in step 131. Then, access point 102 proceeds to step 148, no association.

However, when station 104 is of a traffic type or device type that BSS 100 supports, or when the probe request does not contain sufficient information on the traffic type or device type of station 104, access point 102 proceeds to step 134. Then, in step 134, access point 102 transmits a probe response to station 104. The probe response may include information on the traffic type or device type supported by BSS 100. Also, the probe response may indicate whether station 104 is of a traffic type or device type supported by BSS 100.

Alternatively, access point 102 may not receive a probe request, and, initially, in step 134, access point 102 broadcasts a beacon frame. The beacon frame may contain information on the traffic type or device type supported by BSS 100.

Additionally, the probe response or beacon frame may indicate a time window when a particular type of traffic or type of devices is allowed to operate within BSS 100. The time window may be specified as restrictions or as permissions. For example, access point 102 may indicate that sensor activity is not allowed during rush hour, from 8 am until 11 am. When station 104 has a traffic type associated with it or is of a device type that is only allowed within particular time window, station 104 may only associate with BSS 100 during that time window. When station 104 associates with BSS 100 during the time window, when the time window expires, station 104 may disassociate with BSS 100. Alternatively, station 104 may remain associated, but remain inactive until the window comes up again.

Next, access point 102 may optionally receive an information request from station 104 in step 136. The information request may request information on the service provider for access point 102 or the load of access point 102. Access point 102 may then respond, in step 138, by transmitting an information response containing the requested information.

Then, access point 102 attempts to receive an association request in step 140. Access point 102 may not receive an association request in step 140, indicating that there is no association in step 148. Access point 102 receives an association request in step 140, access point 102 proceeds to step 141. The association request may contain information on the traffic type or device type of station 104. Then, in step 141, access point 102 determines if association will be granted to station 104. For example, association will be granted when station 104 is of a traffic type or device type supported by BSS 100, while association will not be granted if station 104 is not of a traffic type or device type supported by BSS 100. In another embodiment association granting may be performed differently for different channels. For example, BSS 100 may support sensors only in the 1 MHz and 2 MHz channels and offloading devices only in the 4 MHz, 8 MHz, and 16 MHz channels.

When association is not granted in step 141, access point 102 may proceed to step 143, and transmit an association response indicating that association is not granted. Then, access point 102 proceeds to step 148, and there is no association. Alternatively, when association is not granted in step 141, access point 102 may proceed directly to step 148, association not granted.

When association is granted, access point 102 proceeds to step 142, and transmits an association response, which indicates that association is granted to station 104. The association response may contain an AID for station 104. After association is granted, access point 102 synchronizes with station 104 in step 144.

Finally, after station 104 is attached to access point 102, data is transmitted between station 104 and access point 102 in step 146. Access point 102 may transmit data to station 104, and access point 102 may receive data from station 104.

Figure 5:
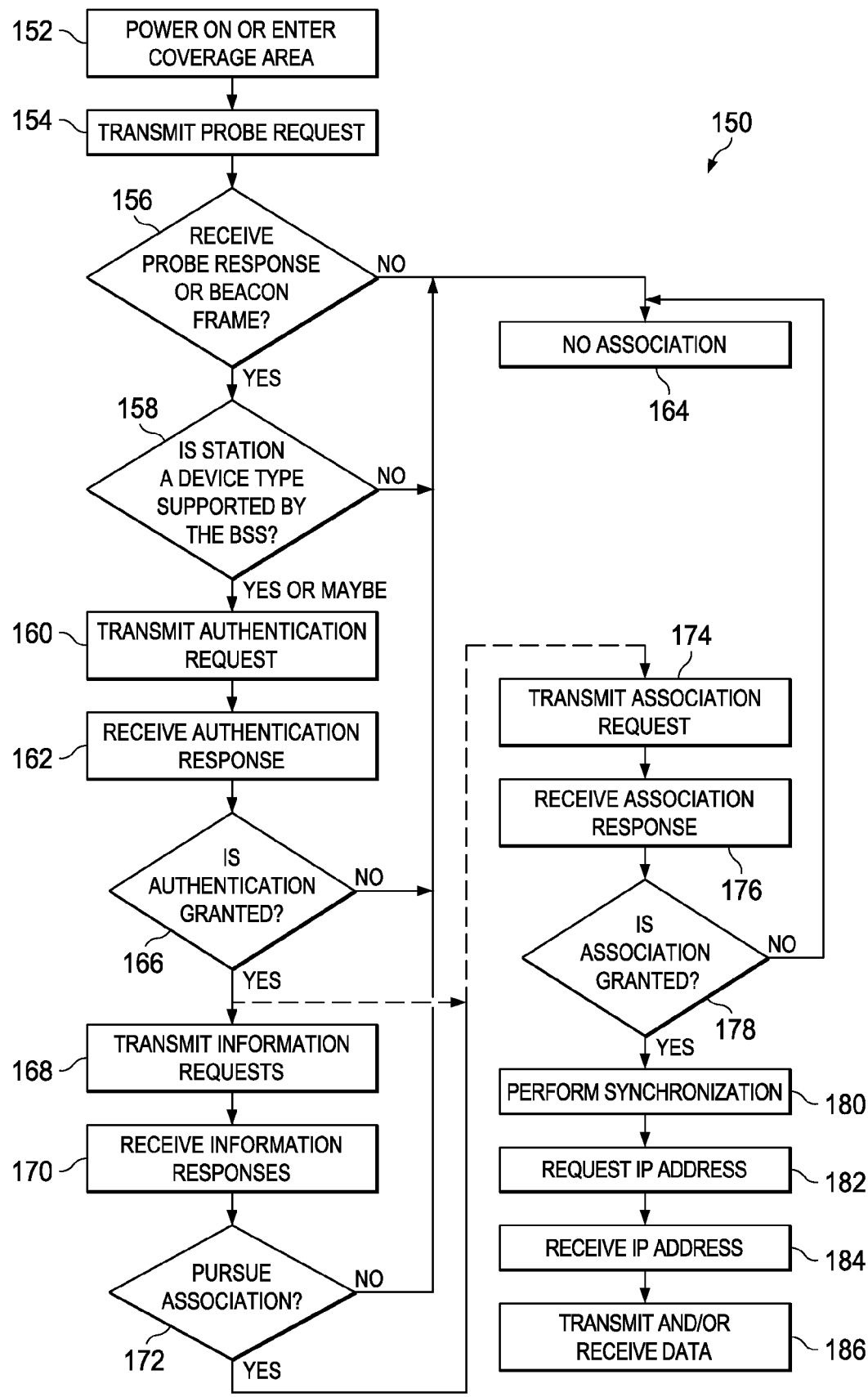
FIG. 5 illustrates another embodiment method for BSS association.

FIG. 5 illustrates flowchart 150 for a method for BSS association. Initially, in step 152, station 104 may power on. Alternatively, station 104 may enter the coverage area of access point 102.

Then, in step 154, station 104 may transmit a probe request to access point 102. The probe request may include information on the traffic type or device type of station 104. In response, station 104 may receive a probe response from access point 102 in step 156. The probe response may indicate whether station 104 is of a traffic type or device type supported by BSS 100. Alternatively, the probe response may contain a BSS traffic type indicator. Access point 102 may not respond to the probe request, indicating that access point 102 will not associate with station 104. If no probe response is received, station 104 may proceed to step 164, no association. If a probe response is received, station 104 may proceed to step 158. Alternatively, station 104 does not transmit a probe request, and, in step 156, receives a beacon frame from access point 102. The beacon frame may contain a BSS traffic type indicator. The probe response or beacon frame may indicate the traffic type or device type supported by BSS 100. Next, in step 158, station 104 may determine whether its traffic type or device type is supported by BSS 100. If station 104 is not of a traffic type or device type supported by BSS 100, station 104 proceeds to step 164, and there is no association. However, if station 104 is of a traffic type or device type supported by BSS 100, station 104 proceeds to step 160. In another embodiment, the probe response or beacon frame does not contain information on the device type supported by BSS 100, and station 104 passes through step 158 to step 160.

In step 160, station 104 transmits an authentication request to verification server 116. In response, station 104 receives an authentication response from verification server 116 in step 162. The authentication response indicates whether station 104 is authenticated. Station 104 then determines if authentication has been granted in step 166. If station 104 is not authenticated, station 104 proceeds to step 164, and no association is achieved. However, if station 104 is authenticated, station 104 may proceed to step 168. Alternatively, if authentication is granted, station 104 may proceed directly to step 174.

In step 168, station 104 transmits an information request to access point 102, and to other access points that station 104 is within the coverage area of. The information request requests information from the access points, such as the service provider or load. In response, in step 170, station 104 receives information responses from the access points containing the information requested. Then, in step 172, station 104 determines if it will pursue authentication with BSS 100. For example, if access point 102 has a heavy load, and another access point has a lower load, station 104 might decide to pursue association with the other access point, and not access point 102. If station 104 decides not to pursue association with access point 102, station 104 proceeds to step 164. However, if station 104 decides not to pursue association with access point 102, station 104 proceeds to step 174.

Next, in step 174, station 104 transmits an association request to access point 102. The association request may include information on the traffic type or device type of station 104. In response, in step 176, station 104 receives an association response from access point 102, which contains information on whether association is granted to station 104. If association is granted, the association response may contain an AID for station 104. In step 178, station 104 determines if association is granted. If association is not granted, station 104 proceeds to step 164, no association, and if association is granted, station 104 proceeds to step 180.

Then, in step 180, station 104 performs synchronization with access point 102. After synchronization, station 104 requests an IP address from verification server 116 in step 182, and station 104 receives an IP address from verification server 116 in step 184.

Finally, in step 186, station 104 and access point 102 exchange data. Station 104 may transmit data to access point 102, and station 104 may receive data from access point 102.

Figure 6:
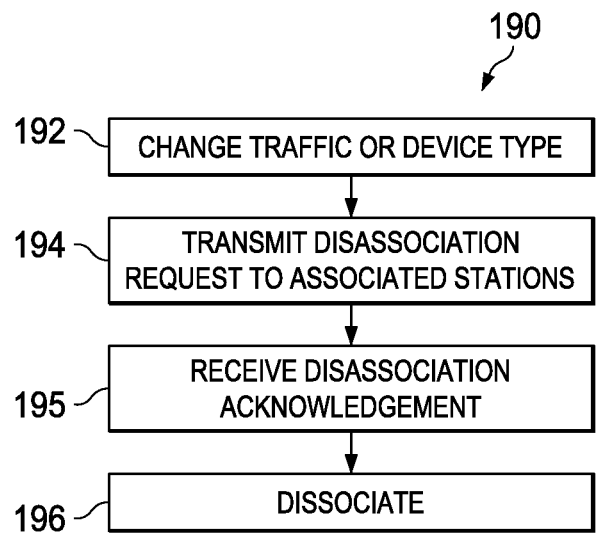
FIG. 6 illustrates an embodiment method for BSS disassociation.

Access point 102 may change the type of traffic it handles or the type of devices that it handles. FIG. 6 illustrates flowchart 190 showing a method of dissociation by access point 102 when it changes the traffic or device type handled. Initially, in step 192, access point 102 changes its traffic type or device type.

Access point 102 immediately, in step 194, transmits a disassociation frame to all associated stations. The dissociation frame may be carried on a management frame. Alternatively, the disassociation request may be carried on a beacon frame. The dissociation request may be repeated several times.

Next, in step 195, access point 102 receives disassociation acknowledgement frames from the stations. After step 195, in step 196, access point 102 disassociates from all associated stations. Access point 102 deletes keys held for communication with the station. Also, access point 102 releases the association identification numbers (AIDs) from the previously associated stations.

Figure 7:
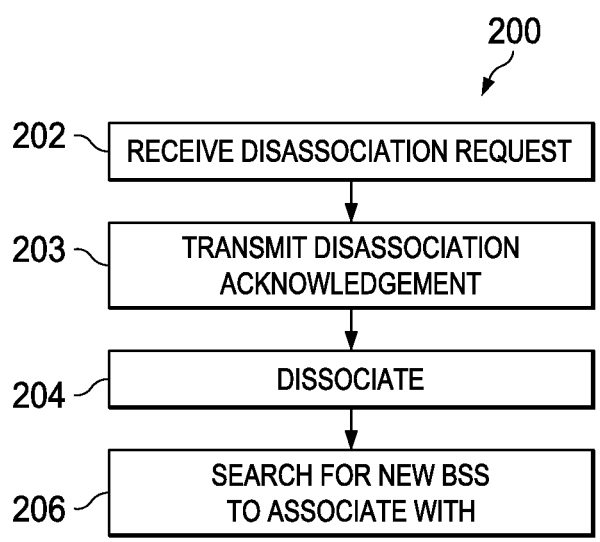
FIG. 7 illustrates another embodiment method for BSS disassociation.

FIG. 7 illustrates flowchart 200 showing a method of dissociation by station 104. Initially, in step 202, station 104 receives a disassociation frame from an access point. The dissociation frame may be received in a management frame or a beacon frame.

Station 104 transmits a disassociation acknowledgement frame. Next, in step 204, the station disassociates from the access point. Keys held by station 104 for communicating with access point 102 are deleted.

Finally, in step 206, the station 104 searches for another BSS or access point to associate with. This may be performed, for example, by performing the method illustrated in flowchart 150.

Figure 8:
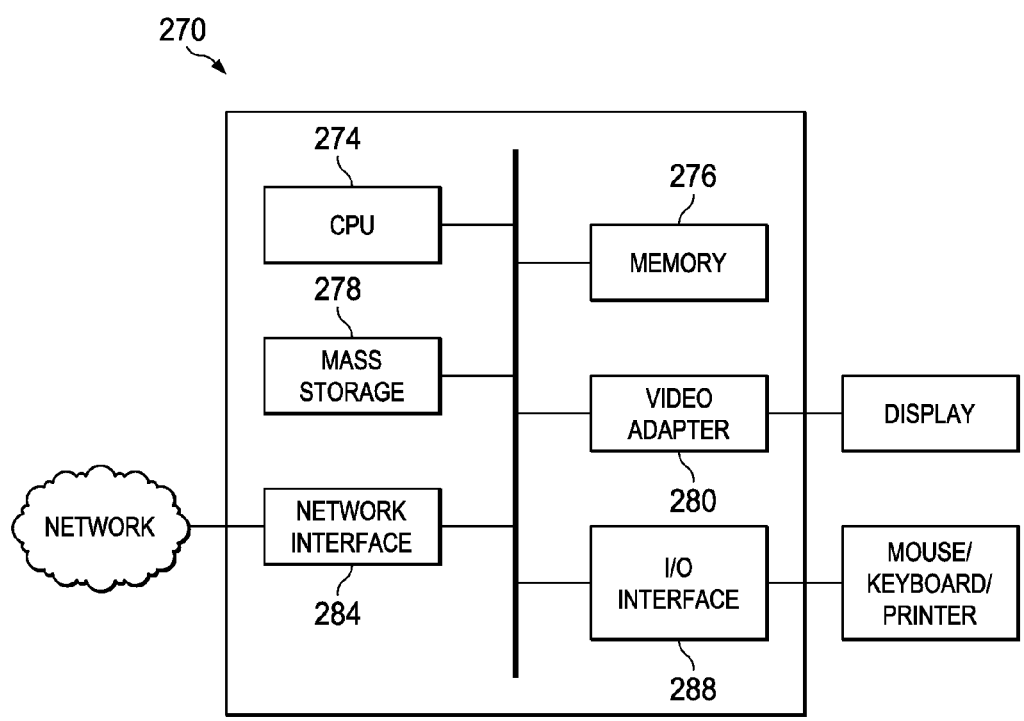
FIG. 8 illustrates a block diagram of an embodiment of a general-purpose computer system.

FIG. 8 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for Basic Service Set (BSS) association, comprising:
    receiving, by a station (STA) from an access point (AP), a frame comprising a STA type support field, wherein the STA type support field indicates a type of station that is allowed to associate with the AP, and wherein the frame is a beacon frame or a probe response frame;
    determining whether to associate the STA with the AP in accordance with whether the STA type support field indicates that a device type of the STA is allowed to associate with the AP; and
    associating the STA with the AP upon determining that the STA type support field indicates that the device type of the STA is allowed to associate with the AP.

2. The method of claim 1, wherein determining whether to associate the STA with the AP comprises determining to associate the STA with the AP when the STA type support field indicates that sensor STAs are allowed to associate with the AP and the device type of the STA is a sensor STA.

3. The method of claim 1, wherein determining whether to associate the STA with the AP comprises determining to associate the STA with the AP when the STA type support field indicates that non-sensor STAs are allowed to associate with the AP and the device type of the STA is a non-sensor STA.

4. The method of claim 1, wherein determining whether to associate the STA with the AP comprises determining to associate the STA with the AP when the STA type support field indicates that both sensor STAs and non-sensor STAs are allowed to associate with the AP and the device type of the STA is either a sensor STA or a non-sensor STA.

5. The method of claim 1, wherein the STA type support field is two bits.

6. The method of claim 1, wherein the STA type support field indicates whether sensor STAs are allowed to associate with the AP, non-sensor STAs are allowed to associate with the AP, or both sensor STAs and non-sensor STAs are allowed to associate with the AP.

7. A method for Basic Service Set (BSS) association, comprising:
    receiving, by an access point (AP) from a first station (STA), a first frame comprising a first STA type support field, wherein the first STA type support field indicates a type of station that is allowed to associate with the AP;
    determining whether to associate the first STA with the AP in accordance with whether the first STA type support field indicates that a device type of the first STA is allowed to associate with the AP; and
    associating the first STA with the AP upon determining that the first STA type support field indicates that the device type of the first STA is allowed to associate with the AP.

8. The method of claim 7, wherein determining whether to associate the first STA with the AP comprises determining to associate the first STA with the AP when the first STA type support field indicates that sensor STAs are allowed to associate with the AP and the device type of the first STA is a sensor STA.

9. The method of claim 7, wherein determining whether to associate the first STA with the AP comprises determining to associate the first STA with the AP when the first STA type support field indicates that non-sensor STAs are allowed to associate with the AP and the device type of the first STA is a non-sensor STA.

10. The method of claim 7, wherein determining whether to associate the first STA with the AP comprises determining to associate the first STA with the AP when the first STA type support field indicates that both sensor STAs and non-sensor STAs are allowed to associate with the AP and the device type of the first STA is either a sensor STA or a non-sensor STA.

11. The method of claim 7, further comprising:
    receiving, by the AP from a second STA, a second frame comprising a second STA type support field;
    determining whether to associate the second STA with the AP in accordance with whether the second STA type support field indicates that a device type of the second STA is allowed to associate with the AP; and
    indicating, by the AP to the second STA, whether to associate the second STA with the AP.

12. The method of claim 7, wherein the first frame comprises an association request comprising the first STA type support field, and wherein the method further comprises transmitting, by the AP to the first STA, a probe response when association is pursued.

13. The method of claim 7, wherein the STA type support field is two bits.

14. The method of claim 7, wherein the STA type support field indicates whether sensor STAs are allowed to associate with the AP, non-sensor STAs are allowed to associate with the AP, or both sensor STAs and non-sensor STAs are allowed to associate with the AP.

15. A station (STA) comprising:
    a processor; and
    a non-transitory computer readable storage medium storing programming instructions, when executing the programming instructions on the processor, to perform the following steps:
        receiving, from an access point (AP), a frame comprising a STA type support field, wherein the STA type support field indicates a type of station that is allowed to associate with the AP, and wherein the frame is a beacon frame or a probe response frame,
        determining whether to associate the STA with the AP in accordance with whether the STA type support field indicates a type of station that is allowed to associate with the AP, and
        associating the STA with the AP upon determining that the STA type support field indicates that a device type of the STA is allowed to associate with the AP.

16. The STA of claim 15, wherein the programming instructions to perform determining whether to associate the STA with the AP comprise programming instructions to perform determining to associate the STA with the AP when the STA type support field indicates that sensor STAs are allowed to associate with the AP and the device type of the STA is a sensor STA.

17. The STA of claim 15, wherein the programming instructions to perform determining whether to associate the STA with the AP comprise programming instructions to perform determining to associate the STA with the AP when the STA type support field indicates that non-sensor STAs are allowed to associate with the AP and the device type of the STA is a non-sensor STA.

18. The STA of claim 15, wherein the programming instructions to perform determining whether to associate the STA with the AP comprise programming instructions to perform determining to associate the STA with the AP when the STA type support field indicates that both sensor STAs and non-sensor STAs are allowed to associate with the AP and the device type of the STA is either a sensor STA or a non-sensor STA.

19. The STA of claim 15, wherein the STA type support field is two bits.

20. The STA of claim 15, wherein the STA type support field indicates whether sensor STAs are allowed to associate with the AP, non-sensor STAs are allowed to associate with the AP, or both sensor STAs and non-sensor STAs are allowed to associate with the AP.

21. An access point (AP) comprising:
a processor; and
a non-transitory computer readable storage medium storing programming instructions, when executing the programming instructions, to perform the following steps:
receiving, from a station (STA), a frame comprising a STA type support field, wherein the STA type support field indicates a type of station that is allowed to associate with the AP,
determining whether to associate the STA with the AP in accordance with whether the STA type support field indicates a type of station that is allowed to associate with the AP, and
associating the STA with the AP upon determining that the STA type support field indicates that a device type of the STA is allowed to associate with the AP.

22. The AP of claim 21, wherein the frame comprises an association request comprising a second STA type support field, and wherein the programming instructions to perform the following steps further comprise programming instructions to perform transmitting, to the STA, a probe response when association is pursued.

23. The AP of claim 21, wherein the STA type support field is two bits.

24. The AP of claim 21, wherein the STA type support field indicates whether sensor STAs are allowed to associate with the AP, non-sensor STAs are allowed to associate with the AP, or both sensor STAs and non-sensor STAs are allowed to associate with the AP.

* * * * *